United States Patent
Wang et al.

(10) Patent No.: US 11,226,526 B2
(45) Date of Patent: Jan. 18, 2022

(54) WIRING STRUCTURE, DISPLAY SUBSTRATE AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Benlian Wang, Beijing (CN); Li Wang, Beijing (CN); Yipeng Chen, Beijing (CN); Yueping Zuo, Beijing (CN); Zheng Liu, Beijing (CN)

(73) Assignees: BOE TECHNOLOGY GROUP CO., LTD., Beijing (CN); CHENGDU BOE OPTOELECTRONICS TECHNOLOGY CO., LTD., Sichuan (CN)

(*) Notice: Subject to any disclaimer, the term of this patent is extended or adjusted under 35 U.S.C. 154(b) by 861 days.

(21) Appl. No.: 15/779,680

(22) PCT Filed: Nov. 8, 2017

(86) PCT No.: PCT/CN2017/109884
§ 371 (c)(1),
(2) Date: May 29, 2018

(87) PCT Pub. No.: WO2018/196326
PCT Pub. Date: Nov. 1, 2018

(65) Prior Publication Data
US 2021/0173270 A1    Jun. 10, 2021

(30) Foreign Application Priority Data

Apr. 28, 2017 (CN) .......................... 201710297270.7

(51) Int. Cl.
G02F 1/1333 (2006.01)
G02F 1/1362 (2006.01)

(52) U.S. Cl.
CPC .. *G02F 1/136286* (2013.01); *G02F 1/133305* (2013.01)

(58) Field of Classification Search
CPC .................................................. G02F 1/136286
See application file for complete search history.

(56) References Cited

U.S. PATENT DOCUMENTS

2005/0205294 A1    9/2005  Yamashita et al.
2014/0138637 A1*   5/2014  Yang ................... H01L 27/1218
                                                257/40
(Continued)

FOREIGN PATENT DOCUMENTS

CN      104538426 A     4/2015
CN      104769719       7/2015
(Continued)

OTHER PUBLICATIONS

Second Office Action for Chinese Patent Application No. 201710297270.7 dated Mar. 15, 2019.
(Continued)

*Primary Examiner* — Sang V Nguyen
(74) *Attorney, Agent, or Firm* — Calfee, Halter & Griswold LLP

(57) ABSTRACT

The application provides a wiring structure, a display substrate, and a display device, which pertain to the field of display technologies. The wiring structure includes a plurality of hollow units connected in series, and each of the hollow units includes a hollow area and a non-hollow area. The non-hollow areas of any two adjacent hollow units at least partially overlap, and the hollow areas thereof do not overlap. Compared with a conventional linear-type wiring (Continued)

structure, the wiring structure can release stress through the hollow area of the hollow unit in the process of bending, stretching, and twisting, so as to avoid breaking of the wiring structure which may result in failure of the device on the substrate that employs the wiring structure.

13 Claims, 3 Drawing Sheets

(56) References Cited

U.S. PATENT DOCUMENTS

| | | | | |
|---|---|---|---|---|
| 2016/0284781 | A1* | 9/2016 | Jiang | H01L 51/56 |
| 2016/0357052 | A1* | 12/2016 | Kim | H01L 51/5237 |
| 2017/0302772 | A1* | 10/2017 | Zhang | H05K 1/028 |

FOREIGN PATENT DOCUMENTS

| | | | |
|---|---|---|---|
| CN | 104868058 | | 8/2015 |
| CN | 204885164 U | | 12/2015 |
| CN | 105224116 A | | 1/2016 |
| CN | 205140985 | * 4/2016 | ............ H01L 22/32 |
| CN | 106205394 | | 12/2016 |
| CN | 206058795 U | | 3/2017 |
| CN | 106971671 | | 7/2017 |
| CN | 107039397 | | 8/2017 |
| JP | 2013-026601 | | 2/2013 |
| WO | 2016053246 A1 | | 4/2016 |

OTHER PUBLICATIONS

First Office Action for Chinese Patent Application No. 201710297270.7 dated Oct. 19, 2018.

International Search Report and Written Opinion from PCT/CN2017/109884 dated Feb. 13, 2018 along with English translation of Written Opinion.

Fourth Office Action for Chinese Patent Application No. 201710297270.7 dated Sep. 29, 2019.

* cited by examiner

WIRING STRUCTURE, DISPLAY SUBSTRATE AND DISPLAY DEVICE

CROSS REFERENCE OF RELATED APPLICATION

The present application is the U.S. national phase entry of PCT/CN2017/109884, with an international filling date of Nov. 8, 2017, which claims the benefit of Chinese Patent Application No. 201710297270.7, filed on Apr. 28, 2017, the entire disclosure of which is incorporated herein by reference.

TECHNICAL FIELD

The present disclosure relates to the field of display technologies, particularly to a wiring structure, a display substrate, and a display device.

BACKGROUND

In order to manufacture a flexible display device, many display components made of organic materials have been developed, such as an organic light emitting layer, an organic passivation layer, and a polymer substrate (e.g. a PI substrate) as a flexible substrate. However, it is difficult to replace the metal wiring in the display with organic materials because the electrical conductivity of organic materials is much lower than that of the metal wiring. When the flexible display device is bent, the metal wiring in the display panel may be broken (the broken wiring ratio is about 1%), resulting in failure of the display device.

SUMMARY

The present disclosure aims to at least alleviate or solve one of the technical problems existing in the prior art, and provides a wiring structure that is not easily broken, a display substrate, and a display device.

The wiring structure provided by embodiments of the disclosure comprises a plurality of hollow units connected in series, each hollow unit comprising a hollow area and a non-hollow area. Non-hollow areas of any two adjacent hollow units at least partially overlap, and hollow areas thereof do not overlap.

In some embodiments, the hollow unit of the wiring structure further comprises at least one bridging part, the bridging part being in the hollow area and connected to the non-hollow area of the hollow unit.

In some embodiments, an outline of the hollow unit has a shape of an approximate rectangle, and non-hollow areas of any two adjacent hollow units corresponding to long sides of the rectangle partially overlap.

In some embodiments, an outline of the hollow unit has a shape of an approximate rectangle, and non-hollow areas of any two adjacent hollow units corresponding to short sides of the rectangle partially overlap.

In some embodiments, an outline of the hollow unit has a shape of an approximate rectangle, and the non-hollow area of one of any two adjacent hollow units corresponding to a long side of the rectangle overlaps the non-hollow area of the other hollow unit corresponding to a short side of is the rectangle.

In some embodiments, an outline of the hollow unit has a D-shape, wherein any two adjacent hollow units form a centrally symmetric pattern.

In some embodiments, a material of the hollow unit includes metal.

Another embodiment of the disclosure provides a display substrate, comprising a base substrate and a wiring structure described in any of the forgoing embodiments which is arranged on the substrate.

In some embodiments, the base substrate includes a flexible substrate.

A further embodiment of the present disclosure provides a display device comprising the display substrate described above.

DETAILED DESCRIPTION OF EMBODIMENTS

Figure 1:
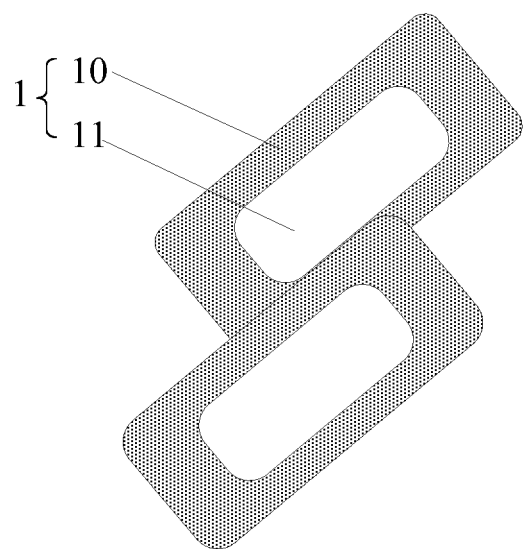
FIG. 1 is a schematic view illustrating two adjacent hollow units in a wiring structure according to an embodiment of the present disclosure.

To enable those skilled in the art to better understand the technical solutions of the present disclosure, the disclosure will be further described in detail below in conjunction with the accompanying drawings and examples.

As shown in FIGS. 1-4, an embodiment of the disclosure provides a wiring structure, which comprises a plurality of hollow units 1 connected in series. Each hollow unit 1 comprises a hollow area 11 and a non-hollow area 10. The non-hollow areas 10 of any two adjacent hollow units 1 at least partially overlap, while the hollow areas 11 do not overlap.

In some embodiments, the non-hollow areas 10 of any two adjacent hollow units 1 which at least partially overlap may be formed in the same layer during preparation, that is, the two hollow units 1 are disposed in the same layer (direct contact). Of course, the two hollow units 1 may also be disposed in two layers. In this case, during preparation, an insulating layer may be arranged between the layers where the two hollow units 1 reside, and the insulating layer is then provided with via holes at positions where it is connected to the two hollow units so that the two hollow units can be electrically connected to each other through the via holes.

Since the wiring structure in the embodiment of the disclosure comprises a plurality of hollow units 1 connected in series, compared with a linear-type wiring structure, the wiring structure according to an embodiment of the disclosure can release the stress through the hollow areas 11 of the hollow units 1 in the process of bending, stretching and twisting, so as to avoid breaking of the wiring structure that may result in failure of the device on the substrate that employs the wiring structure. Moreover, in this embodiment, the non-hollow areas 10 of any two adjacent hollow units 1 at least partially overlap, that is, the area of the connecting position between adjacent hollow units 1 is relatively large, which can effectively avoid breaking of the wiring structure at the connecting positions between two hollow units 1 in the process of bending, stretching and twisting, thereby ensuring the yield of the wiring structure. Particularly, since the flexible substrate itself is prone to bending, using the wiring structure proposed in the disclosure can greatly improve the yield of the flexible substrate.

Figure 2:
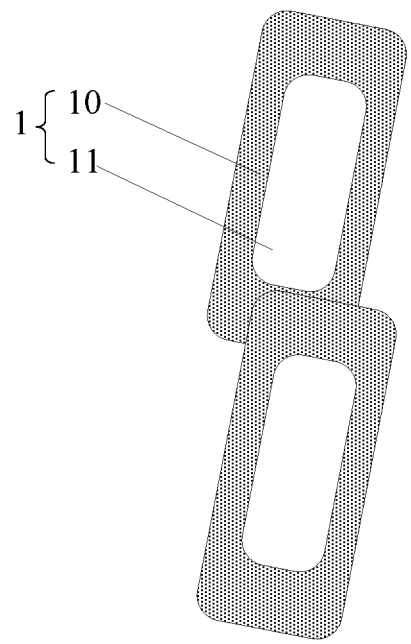
FIG. 2 is a schematic view illustrating two adjacent hollow units in a wiring structure according to another embodiment of the present disclosure.
Figure 3:
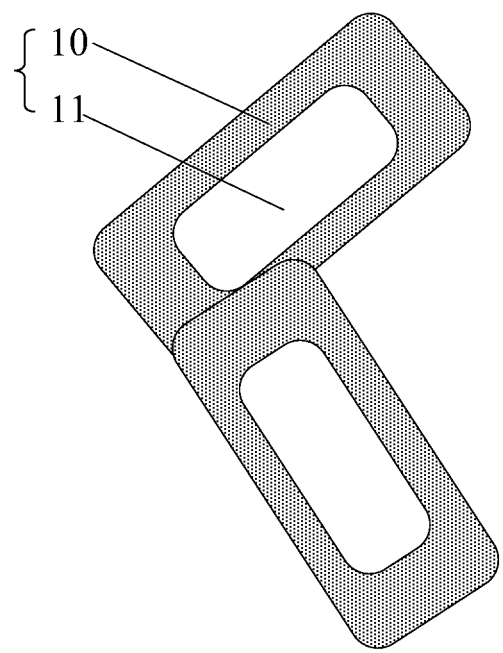
FIG. 3 is a schematic view illustrating two adjacent hollow units in a wiring structure according to another embodiment of the present disclosure.

In some embodiments, as shown in FIGS. 1-3, the outline of each hollow unit 1 in the wiring structure is approximately rectangular, that is, the overall outline of the non-hollow area 11 enclosing the hollow area 10 of the hollow unit 1 has an approximately rectangular shape. However, the outline of the non-hollow area 11 may also be in other shape different from a rectangle, which is not limited in the present disclosure. In the example in which the outline of the non-hollow area 10 of the hollow unit 1 has an approximately rectangular shape, the outer edge of the non-hollow area 10 includes two long sides and two short sides. The two long sides are a first side and a second side, respectively, and the two short sides are a third side and a fourth side, respectively. Some examples regarding the connection between adjacent hollow units are given below.

In the example shown in FIG. 1, the first side of the non-hollow area 10 of one of any two adjacent hollow units 1 at least partially overlaps the second side of the non-hollow area 10 of the other hollow unit.

In another example, as shown in FIG. 2, the third side of the non-hollow area 10 of one of any two adjacent hollow units 1 at least partially overlaps the fourth side of the non-hollow area 10 of the other hollow unit.

In another example, as shown in FIG. 3, the first side of the non-hollow area 10 of one of any two adjacent hollow units 1 at least partially overlaps the third side or the fourth side of the non-hollow area 10 of the other hollow unit. Similarly, the second side of the non-hollow area 10 of one of any two adjacent hollow units 1 at least partially overlaps the third side or the fourth side of the non-hollow area 10 of the other hollow unit.

Figure 4:
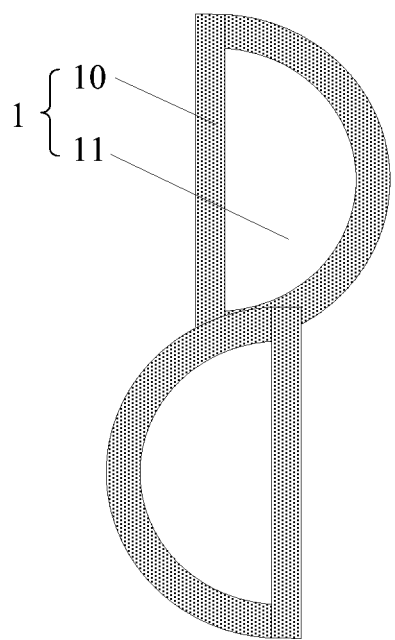
FIG. 4 is a schematic view illustrating two adjacent hollow units in a wiring structure according to a further embodiment of the present disclosure.

According to another embodiment of the present disclosure, as shown in FIG. 4, the outline of each hollow unit 1 in the wiring structure has a D-shape. Any two adjacent hollow units 1 form a centrally symmetric pattern, and the center of symmetry is the central point of the connecting position therebetween.

It is to be noted here that the outline of the hollow unit 1 in the embodiment of the disclosure is not limited to the approximately rectangular shape and the D-shape described above, but may also be in other shapes, such as a circle, a hexagon, and the like, as long as it satisfies the condition that the non-hollow areas of adjacent hollow units at least partially overlap. In this way, even if one connection point is broken in the process of bending, stretching and twisting of the wiring structure, the connections at the remaining positions can still ensure the normal connection of the wiring structure, which may further prevent failure of the display device.

Figure 5:
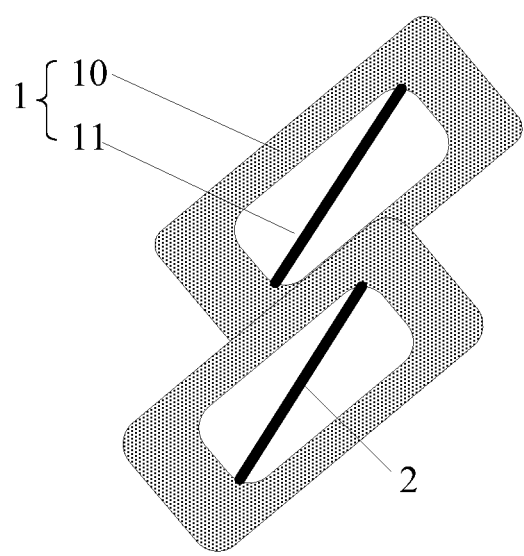
FIG. 5 is a schematic view illustrating two adjacent hollow units in a wiring structure according to yet another embodiment of the present disclosure.

According to another embodiment of the disclosure, as shown in FIG. 5, the hollow unit 1 in the wiring structure in this embodiment may further comprise at least one bridging part 2 which is in the hollow area of the hollow unit and connected to the non-hollow area. In the example of FIG. 5, the bridging part 2 is connected between different positions of the inner edge of the non-hollow area 10 of the hollow unit 1. Such bridging parts can effectively increase the yield of the wiring structure.

The material for the hollow units in the embodiments of disclosure may include metal, so that it can be ensured that the wiring structure has good conductivity. Of course, other conductive materials may also be used, which will not be enumerated here.

A further embodiment of the disclosure provides a display substrate comprising a base substrate and a wiring structure arranged on the base substrate. The wiring structure may be a wiring structure as described in any of the foregoing embodiments.

The display substrate in this embodiment may be a flexible substrate, that is, the material used for the base substrate is a flexible material, such as polyimide (PI) or the like.

Since the wiring structure in the display substrate in the embodiment of the present disclosure comprises a plurality of hollow units connected in series, during the process of bending, stretching and twisting of the display substrate, the wiring structure may release the stress through the hollow units so as to avoid occurrence of breaking which may result in failure of the device on the substrate. Particularly, since the flexible substrate itself is prone to bending, using the wiring structure in this embodiment can greatly improve the yield of the flexible substrate.

Yet another embodiment of the disclosure provides a display device comprising the display substrate described in the foregoing embodiment. The display device may be a liquid crystal display device or an electroluminescent display device, for example, any product or component having a display function such as a liquid crystal panel, an electronic paper, an OLED panel, a mobile phone, a tablet computer, a television, a monitor, a notebook computer, a digital photo frame, a navigator, and the like.

It can be understood that the above embodiments are merely exemplary embodiments for explaining the principle of the disclosure. However, the invention is not so limited. For those ordinarily skilled in the art, various modifications and improvements can be made without departing from the spirit and the essence of the disclosure. These modifications and improvements shall also be regarded as falling into the scope of the invention.

The invention claimed is:

1. A wiring structure, comprising a plurality of hollow units connected in series, each hollow unit comprising a hollow area and a non-hollow area, wherein non-hollow areas of any two adjacent hollow units at least partially overlap, and hollow areas thereof do not overlap,
    wherein an outline of the hollow unit has a shape of an approximate rectangle, wherein the hollow unit of the wiring structure further comprises at least one bridging part, the bridging part extends along a diagonal line of the approximate rectangle in the hollow area and is connected to the non-hollow area of the hollow unit,
    wherein the wiring structure comprises an insulating layer between the any two adjacent hollow units , the insulating layer comprises via holes, and the any two adjacent hollow units are electrically connected to each other through the via holes,
    wherein the hollow unit in the shape of the approximate rectangle comprises a long side and a short side, wherein the non-hollow area of one of any two adjacent hollow units of the plurality of hollow units corresponding to the long side partially overlaps the non-hollow area of the other one of the any two adjacent hollow units of the plurality of hollow units corresponding to the short side.

2. The wiring structure according to claim 1, wherein the non-hollow areas of any two adjacent hollow units corresponding to long sides of the rectangle partially overlap.

3. The wiring structure according to claim 1, wherein the non-hollow areas of any two adjacent hollow units corresponding to short sides of the rectangle partially overlap.

4. The wiring structure according to claim 1, wherein a material for the hollow unit comprises metal.

5. A display substrate, comprising a base substrate and the wiring structure according to claim 1 arranged on the base substrate.

6. The display substrate according to claim 5, wherein the base substrate comprises a flexible substrate.

7. A display device comprising the display substrate according to claim 5.

8. The display substrate according to claim 5, wherein the hollow unit of the wiring structure further comprises at least one bridging part, the bridging part being in the hollow area and being connected to the non-hollow area of the hollow unit.

9. The display substrate according to claim 5, wherein an outline of the hollow unit has a shape of an approximate rectangle, wherein the non-hollow areas of any two adjacent hollow units corresponding to long sides of the rectangle partially overlap.

10. The display substrate according to claim 5, wherein an outline of the hollow unit has a shape of an approximate rectangle, wherein the non-hollow areas of any two adjacent hollow units corresponding to short sides of the rectangle partially overlap.

11. The display substrate according to claim 5, wherein an outline of the hollow unit has a shape of an approximate rectangle, wherein the non-hollow area of one of any two adjacent hollow units corresponding to a long side of the rectangle partially overlaps the non-hollow area of the other hollow unit corresponding to a short side of the rectangle.

12. The display substrate according to claim 5, wherein an outline of the hollow unit has a D-shape, wherein any two adjacent hollow units form a centrally symmetric pattern.

13. The display substrate according to claim 5, wherein a material for the hollow unit comprises metal.

* * * * *